United States Patent
Eikelis et al.

(10) Patent No.: US 9,959,453 B2
(45) Date of Patent: May 1, 2018

(54) METHODS AND SYSTEMS FOR THREE-DIMENSIONAL RENDERING OF A VIRTUAL AUGMENTED REPLICA OF A PRODUCT IMAGE MERGED WITH A MODEL IMAGE OF A HUMAN-BODY FEATURE

(75) Inventors: Alex Eikelis, Rishon le Zion (IL); Rami Shtainer, Jerusalem (IL); Darya Frolova, Be'er Ya'akov (IL); Alex Sadikov, Ramat Gan (IL); Dmitry Pundik, Ashkelon (IL)

(73) Assignee: AR (ES) Technologies Ltd., Rishon LeZion (IL)

( * ) Notice: Subject to any disclaimer, the term of this patent is extended or adjusted under 35 U.S.C. 154(b) by 862 days.

(21) Appl. No.: 12/748,420

(22) Filed: Mar. 28, 2010

(65) Prior Publication Data
US 2011/0234581 A1   Sep. 29, 2011

(51) Int. Cl.
| | | |
|---|---|---|
| G06T 15/00 | (2011.01) | |
| G06K 9/00 | (2006.01) | |
| G06T 19/00 | (2011.01) | |
| G02C 13/00 | (2006.01) | |

(52) U.S. Cl.
CPC ........ G06K 9/00228 (2013.01); G06T 19/006 (2013.01); G02C 13/003 (2013.01)

(58) Field of Classification Search
None
See application file for complete search history.

(56) References Cited

U.S. PATENT DOCUMENTS

| | | | | |
|---|---|---|---|---|
| 8,155,400 | B2 * | 4/2012 | Bronstein et al. | 382/118 |
| 8,175,931 | B2 * | 5/2012 | Harvill et al. | 705/26.1 |
| 2002/0105530 | A1 * | 8/2002 | Waupotitsch et al. | 345/630 |
| 2003/0184544 | A1 * | 10/2003 | Prudent | 345/419 |
| 2005/0162419 | A1 * | 7/2005 | Kim et al. | 345/419 |
| 2007/0031028 | A1 * | 2/2007 | Vetter et al. | 382/154 |
| 2007/0115350 | A1 * | 5/2007 | Currivan et al. | 348/14.08 |
| 2008/0247636 | A1 * | 10/2008 | Davis et al. | 382/152 |
| 2010/0194863 | A1 * | 8/2010 | Lopes et al. | 348/50 |
| 2011/0181591 | A1 * | 7/2011 | Benitez et al. | 345/426 |

OTHER PUBLICATIONS

Samaras, D.; Metaxas, D.; Fua, P.; Leclerc, Yvan G., "Variable albedo surface reconstruction from stereo and shape from shading," Computer Vision and Pattern Recognition, 2000. Proceedings. IEEE Conference on , vol. 1, No., pp. 480,487 vol. 1, 2000.*
M. Shah, Caustics Mapping: An Image-space Technique for Real-time Caustics, IEEE Transaction on Visualization and Computer Graphics, vol. 13, Issue: 2, 2007.
http://en.wikipedia.org/wiki/3D_rendering.
http://en.wikipedia.org/wiki/Shading.
http://en.wikipedia.org/wiki/Color_bleeding_(computer_graphics).

* cited by examiner

*Primary Examiner* — Xiao Wu
*Assistant Examiner* — Mohammad H Akhavannik
(74) *Attorney, Agent, or Firm* — Reuven Mouallem; FlashPoint IP, Ltd.

(57) ABSTRACT

A system for rendering a merged virtual 3D augmented replica of a 3D product image and a 3D model image of a body part. A 3D modeling engine transforms an acquired 2D image of a body part into a 3D augmented replica thereof. A GUI enables the merging, displaying and manipulating of the 3D product image and the 3D augmented replica of a body part.

39 Claims, 2 Drawing Sheets

METHODS AND SYSTEMS FOR THREE-DIMENSIONAL RENDERING OF A VIRTUAL AUGMENTED REPLICA OF A PRODUCT IMAGE MERGED WITH A MODEL IMAGE OF A HUMAN-BODY FEATURE

FIELD AND BACKGROUND OF THE INVENTION

The present invention relates to the rendition of virtual three-dimensional models and, more particularly, to a system and method for three-dimensional (3D) rendering of a virtual augmented replica (AR) of a human-body feature that can be merged with a model image of a product.

The advent of the Internet has enabled consumers to expand their options in selecting and purchasing products by allowing the consumers to view products on product-related websites. In many instances, a consumer will not complete the purchase of a product (e.g. eyewear, jewelry, and clothing) because the consumer is concerned how the product will "look" on them. Furthermore, in addition to the cosmetic appearance of the product, the consumer may also be concerned about how the product will fit. The Internet is therefore relegated to functioning as a research tool whereas the act of purchasing the product is completed in a physical retail store. In many cases the exact item identified during the Internet research is not readily available at the local retailer, this in addition to the inconvenience to the customer regarding the time and travel needed to get to said retailer. In addition, the retailer is likely to lose potential customers due to the inability of buying such products online.

In an effort to combat global terrorism and increased criminal activity, major airports and traffic hubs have begun employing biometric scanners and video cameras. Images captured with these biometric cameras can be specially enhanced to allow cross referencing of the captured images with pictures of known terrorists and criminals found in security databases. Facial recognition software exists which allows for the said cross-referencing. It would be advantageous, however, to have a system that enhances the capabilities of standard security cameras, allowing them to provide the same specially enhanced images as biometric cameras, with the added advantages of not having to acquire the expensive biometric cameras, nor having to replace the existing apparatuses which are already in place.

In the field of special effects for the entertainment business, custom made face masks are common place, for single or ongoing use. Currently, a 3D model of the subject face must be created either by artists or, more commonly, by making a clay replica of the subject face, upon which the mask will be created. This procedure is time consuming and costly, not to mention a great inconvenience to the subject who has to endure the uncomfortable model making process.

It would, therefore, be very convenient to have a system that facilitates the creation of such masks and other special effects paraphernalia with little or no inconvenience to the subject, whilst saving time and money.

In the fields of plastic, reconstructive and maxillofacial surgery, as well as any other surgery pertaining to the face, it is highly advantageous for a surgeon to create a model of the area which the surgeon intends to operate on, in order to allow the surgeon to plan and practice the procedure before performing it on a patient. This method is currently used in the Walter Reed Army Medical Center. A specialized 3D imaging device is used to capture the 3D rendition which is then processes using specialized software and sent to a 3D printer. Additionally, this model (virtual or physical) can be used to help explain a procedure to a patient or present an exact representation of the final outcome of the procedure. It would be advantageous to be able to create a virtual AR from 2D images, using standard imaging technology, such as a digital camera. Furthermore, having a 3D AR with the ability to "peel away" the layers of skin to reveal muscle and nerve structure, would greatly enhance the use of the system for educational purposes and for preparatory activities leading up to actual surgery.

In the field of online and offline video games, the practice of creating animated 3D figures of real-life people (e.g. Michael Jordan in NBA related video games) entails a great amount of effort, time and money. It would be highly advantages to have a system for rendering a 2D image into a 3D virtual model without the protracted and expensive process of creating such a virtual model by hand.

Currently, the production and customization of toys and memorabilia is relatively limited to articles which are mass produced and marketed. An individual can customize such an article by employing various printing techniques, such as, for example, printing a name or company logo on a mug or t-shirt. With the advent and cheapening of 3D printers, it is possible to produce memorabilia and toys on an individual basis. It would be advantageous to be able to create a 3D AR of a desired product, from a 2D image, to be sent to a fulfillment house for fabrication using a 3D printer. For example, a father of 3 children could have keychain-size models of the children's faces fabricated and sent to his wife as an anniversary present.

Definitions

For the purpose of clarity, several terms are defined in the context of the present application. The term "model image" is used to refer to a two-dimensional (2D) image of at least one human-body feature (e.g. head, hair, neck, and arm). The term "product image" is used to refer to an image (i.e. 2D or 3D) of a consumer product. The terms "virtual replica" and "virtual 3D replica" are used to refer to a virtual 3D rendering of a 2D model image. The terms "virtual augmented replica" and "virtual AR" are used to refer to a virtual 3D rendering of a 2D model image that has been augmented by a parameterized anatomical model of the same feature. The terms "merged virtual augmented replica" and "merged virtual AR" are used to refer to the merging of a virtual AR with a product image. Such a 3D rendering includes more than a simple superposition or combination of the model image with the product image.

SUMMARY OF THE INVENTION

According to the present invention there is provided a system for rendering a merged virtual 3D augmented replica including (a) a 2D/3D product database of product images; (b) a 2D model manager for storing an acquired 2D model image of a body part; (c) a 3D modeling engine for transforming the 2D model image of the body part into a virtual 3D augmented replica thereof; and (d) a graphic user interface for merging a selected product image from the product database with the virtual 3D augmented replica, wherein the GUI is operable to display and manipulate the merged virtual 3D augmented replica.

According to further features in the described preferred embodiments there is provided an actuating unit for actuating the merged virtual 3D AR on a physical medium such as a 2D or 3D printer. According to still further features in the described preferred embodiments the body part is a face. According to still further features in the described preferred embodiments the virtual 3D AR includes a layer of musculature as well as a bone structure. According to still further features in the described preferred embodiments the GUI can simulate muscular activity such as smiling, frowning, raising of the eyebrows, opening and closing of the eyes and mouth, and where such activities causes the virtual product to be reciprocally effected so that the product moves when the 3D AR smiles or pressure is applied by the product on the virtual AR.

According to still further features in the described preferred embodiments the GUI can enhance the merged virtual 3D AR by changing the product color, adding surrounding environments such as night, day, outdoors, indoors, and manipulating the parameters of the product image. The product images can be eyeglasses, headwear, cosmetics and facial jewelry.

According to another embodiment the GUI can enhance the virtual 3D AR of a face by adding accessories, modifying and cartoonizing facial features, simulate expressions, add a body as well as platforms such as user-defined stands, keychains, memorabilia and utility accessories. According to still further features in the described preferred embodiments the virtual 3D AR can be a figurine, a computer implemented video game character, a face mask and a virtual surgery simulation object.

According to another embodiment of the invention there is provided a method for rendering a virtual 3D augmented replica (AR) including the steps of: (a) receiving a 2D image of a body part; (b) providing a parameterized anatomical model of the body part; (c) constructing a virtual 3D replica that corresponds to the 2D image of the body part; (d) adjusting values of parameters of the parameterized anatomical model to conform the parameterized model to the virtual 3D replica, thereby providing the virtual 3D augmented replica of the body part and outputting the virtual augmented replica to a medium such as a storage medium, a display medium such as a GUI and transmission medium.

According to further features in preferred embodiments of the invention the anatomical model includes a layer of musculature and a skeletal bone structure. According to still further features in preferred embodiments of the invention, the body part is a face. According to still further features in preferred embodiments of the invention the virtual 3d replica is in the format of a depth map, or a set of polygons or an array of dots.

According to further features in preferred embodiments of the invention the virtual 3D replica is constructed from the 2D image by: (i) extracting features from the 2D images; (ii) providing a plurality of virtual 3D replicas; providing, for each virtual 3D replica, a corresponding plurality of 2D features; (iv) assigning a respective measure of similarity of each of the extracted features to each of a plurality of similar stored 2D features of corresponding stored virtual 3D replicas; and (v) constructing the new virtual 3D replica by blending the stored virtual 3D replicas based on the respective measures of similarity.

According to another embodiment there is provided a system for rendering a virtual 3D augmented replica including: (a) a 2D model manager for storing an acquired 2D model image of a body part; (b) a parameterized anatomical model of the body part; (c) a virtual 3D replica generator for constructing a virtual 3D replica that corresponds to the acquired 2D model image; (d) a 3D modeling engine configured to adjust the values of the parameters of the parameterized anatomical model to conform the parameterized model to the virtual 3D replica, thereby providing the virtual 3D augmented replica of the body part; and (e) a medium for outputting the virtual 3D augmented replica such as a storage medium, a display medium such as a GUI and a transmission medium.

According to further features in preferred embodiments of the invention the parameterized anatomical model includes a layer of musculature and a skeletal bone structure. According to still further features in preferred embodiments of the invention the body part is a face. According to still further features in the described preferred embodiments the 3D replica is a depth map or a set of polygons or an array of dots. According to still further features in preferred embodiments of the invention the virtual 3D replica generator is configured to (i) extract features from the 2D image; (ii) provide a plurality of virtual 3D replicas; (iii) provide for each virtual 3D replica, a corresponding plurality of 2D features; (iv) assign a respective measure of similarity of each extracted feature to each of a plurality of similar stored 2D features of corresponding stored virtual 3D replicas; and (v) construct the virtual 3D replica by blending the stored virtual 3D replicas based on the respective measures of similarity.

The present invention successfully addresses the shortcomings of the presently known configurations by providing a user-friendly system for creating virtual ARs and merged virtual ARs. A local (client based) or online system having a user-friendly GUI allows an individual to import or upload an image of a body part, such as but not limited to, a face. The system converts the 2D image into a 3D model termed a virtual AR. The 3D model is augmented with anatomically correct musculature and bone structure of the body part. The user is able to manipulate the 3D model using the GUI. The current invention therefore allows for customers to virtually shop for items such as eyeglasses, jewelry, clothing etc. "trying on" the various products by virtually merging the product with the 3D model. Specific GUI manipulations discussed below allow the user to have an online experience comparable with a physical one.

In the realm of video imagery, the current invention enhances standard surveillance cameras with capabilities characteristic of biometric scanners and video cameras. Standard 2D facial images received from an image recording device, such as a surveillance camera, are enhanced with the innovative system to create 3D models of the face, improving the quality of the low resolution facial images, thereby allowing the depicted face to be compared against facial databases, such as an FBI database.

In the field of special effects for the entertainment business, the current invention enables a FX specialist to create face models of actors for the purpose of creating face-masks. The system creates a virtual 3D model from a 2D image. The model can then be created by a 3D printer.

In the field of reconstructive surgery, the innovative system creates a 3D model from a 2D image, without the use of expensive and complicated equipment such as a 3D scanner.

In the field of realistic on and offline games, the current innovative system can cost effectively and time efficiently create a virtual 3D AR from 2D images of real life people.

In the field of personalized memorabilia production, the current innovative system provides an easy-to-use GUI for the on and offline creation of virtual 3D ARs which can then be created and shipped by the system clearing-house facility.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The present invention relates to a method and system for 3D-rendering of a virtual AR of a human-body feature, preferably the face. The principles and operation for providing such 3D-rendering of a virtual AR, according to the present invention, may be better understood with reference to the accompanying description and the drawings.

Figure 1:
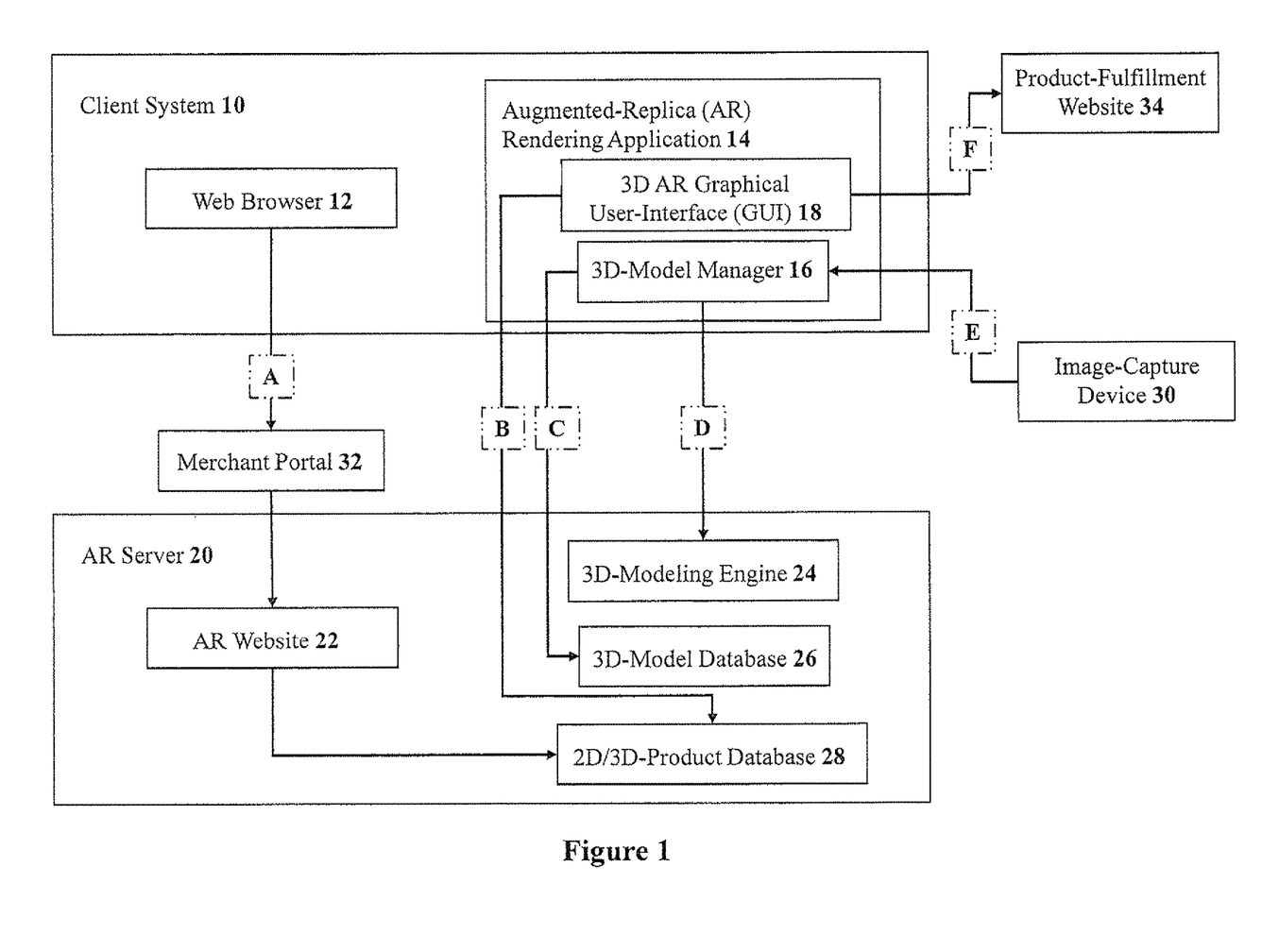
FIG. 1 is a simplified schematic block diagram of an AR-rendering application and rendering databases.

Referring now to the drawings, FIG. 1 is a simplified schematic block diagram of an AR-rendering application and rendering databases in an on-line user environment, according to preferred embodiment of the present invention, whereby a 3D product image is merged with a virtual AR of a human-body feature. A client system 10 (e.g. PC, laptop, PDA, or mobile phone), having Internet access, is shown with a web browser 12 and an AR-rendering application 14. AR-rendering application 14 includes a 3D-model manager 16 for rendering 3D models of model images, and a 3D AR graphical user-interface (GUI) 18 for enabling a user to view the product/model AR.

An AR Server 20 is shown having an AR website 22, a 3D-modeling engine 24, a 3D-model database 26, and a 2D/3D-product database 28. It is noted that AR-rendering application 14 is an end-user (or client) application that can be used online with an AR website or can optionally be installed on client system 10 by a user (e.g. via downloading from AR website 22). An image-capture device 30 (e.g. camera or scanner) can be used to supply 3D-model manager 16 with a model image.

Virtual AR Head Model Creation

Each virtual AR is created taking an existing parameterized anatomical head model (having standard proportional dimensions), having a skeletal structure, overlaid with predefined musculature. Anatomic musculature does not differ from individual to individual, it is only the dimensions of the bone structure and facial features that give the proportions and layout of the subcutaneous system of muscles, nerves etc. An impression of the exact facial contours, features, skin tone etc. is then merged with the parameterized anatomical head model. Musculature and skull dimensions are brought into conformity with the facial dimensions gleaned by the optimization algorithms (discussed below), resulting in a virtual AR of the head with detail exact at most to approximately 0.5 mm. 3D-modeling engine 24 can create a 3D model from a single or numerous 2D model images of the respective body parts.

2D/3D Head Model Database

In a preferred embodiment of the current invention, there exists a 2D/3D database containing (a) 2D head images (b) virtual 3D replicas corresponding to the 2D images and (c) 3D shapes of distinct facial features pertaining to the virtual 3D replicas. The virtual 3D replicas and shapes, in one exemplary non-limiting embodiment, are in the format of 'depth maps' of the same.

Head and Face

In order to create a 3D model of a head and/or face, a 2D model image of the head and/or face is needed, where the profile aspect of the face is visible as well as at least one eye. Visibility of at least one ear is preferable but not necessary. 3D-modeling engine 24 uses unique algorithms as well as algorithms known in the art, to generate the virtual AR from the model image(s) of body features (e.g. face, skin, hair, and/or torso) as explained below.

Figure 2:
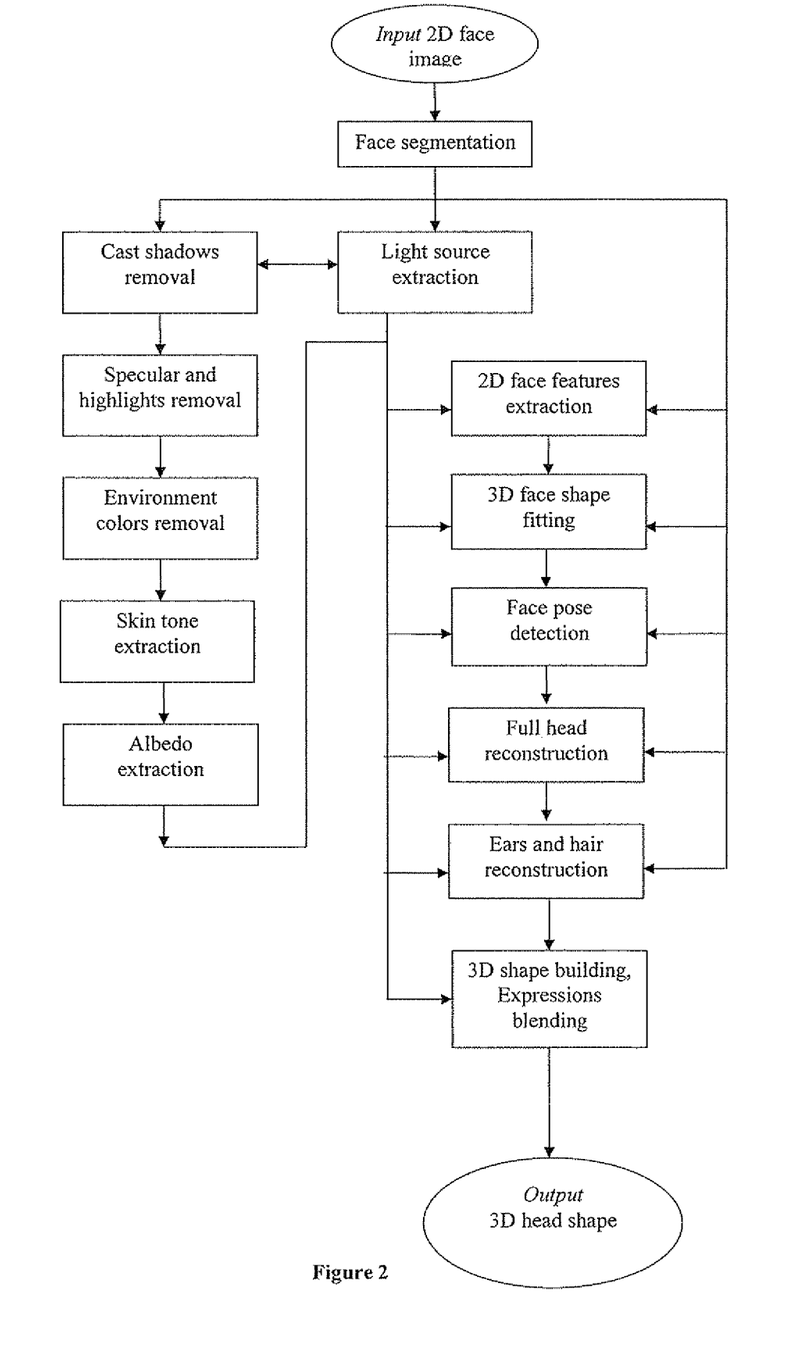
FIG. 2 is a flow chart of an exemplary algorithm for the rendering of a virtual AR of a head from a 2D model image.

One such exemplary algorithm for the rendering of a 3D virtual AR of a head and face from a 2D model image is depicted in FIG. 2 and includes the steps of:
1. Inputting 2D face image;
2. Face detection;
3. Skin tone extraction and environment colors removal
4. 2D face features extraction
5. Face segmentation
6. Light source direction extraction
7. Cast shadows removal
8. Specularities and highlights removal
9. Albedo extraction
10. Face pose detection
11. 3D face fitting
12. Full head reconstruction;
13. Ears and hair reconstruction;
14. 3D shape building, expressions blending;
15. Merging 3D facial features with parameterized anatomical head model.

Detailed Description of Optimization Algorithms

Face Segmentation

An innovative algorithm utilizing face feature detection and skin color information determines: (a) the location of the face within the image; (b) the exact contours of the face; and (c) the location of significant features on the face. Face location: the face location is determined based on a result of a trained face classifier Once located, the face is segmented from the image by comparison of the colors found in segments of the detected face area to those stored in skin-color databases. In order to locate significant face features (facial attributes such as eyes, eyebrows, mouths, etc.) a number of classifiers are built. Each classifier is based on special features (e.g. Haar wavelet features) and is trained on a large database of corresponding 2D facial patches (patches that contain corresponding facial attribute). The trained classifier is able to detect facial attributes in new images thus providing updated color information for color segmentation algorithm. Exact contours of the face: morphological operations, spline curve fitting and a convex hull computation algorithm are used to obtain a final facial contour.

Computation of Light Source

An algorithm is used to calculate the light source parameters. Face reflectance is modeled according to Lambert cosine law with discreet light sources and ambient lighting. The framework uses the 3D facial shapes in the database, coupled with the recovered/extracted face albedo (see "*Albedo Computation and Extraction*" below) from the input image. By using the fact that many parts of 3D facial shapes are similar between different individuals (forehead, cheeks etc. or even the whole face) a Lambert equation for the unknown light is solved for each of such database shape part. Then an optimal light direction is chosen. Once calculated, the light source direction and resulting effects (e.g. cast shadows, specular effects, highlights, environmental colors) can be detected and removed from the image.

Albedo (Color and Texture) Computation and Extraction

The color and texture information of the 2D image is calculated using another unique algorithm for albedo computation. With the vast majority of pictures taken in non-laboratory settings, shadows and distortions to the albedo are created by the directional light source in the image. In order to compute the natural albedo from a regular (non-laboratory) image, the albedo from smooth, shadow-less areas of the face is extracted and used in an iterative smoothing algorithm such as, but not limited to, a Gaussian pyramid, to connect all the regions to form a natural looking albedo face image. The algorithm uses a method of 2D facial features extraction discussed below (see "Extraction of 2D Facial Features") to detect facial areas of interest (AOI) that include eyes, mouth and other facial features. AOIs are defined largely by edges, the same edges which often denote shadows, whereas other facial areas (such as cheeks, nose etc.) are less likely to contain edges, as they are smooth areas. The albedo from these areas is used in the smoothing algorithm. The result of this algorithm is an image with the same resolution as the original input image, which contains the approximate albedo values. Unnatural skin tone and albedo are thereby removed from the image.

Extraction of 2D Facial Features

A unique algorithm detects the exact locations of important facial features such as eyes, nose, mouth, wrinkles etc. A trained cascade classifier initially detects approximate locations of important facial features. The locations are further refined by extracting edge and intensity information. Global face parameters (size proportions and relative feature positions) are employed to correct the resulting feature locations. The output of the algorithm is a vector of control points which is used to detect correspondence between 2D database images, and the input 2D image, vis-à-vis the boundaries of the facial features.

Other exemplary algorithms utilize parameters (and processed parameters) including:
1. illumination-type detection (i.e. source of illumination in model image);
2. illumination-direction detection;
3. reflection-type detection;
4. initial generic skull (or torso) model;
5. facial-parameter extraction (e.g. head edges, nose location, eye locations, ear locations, beauty marks);
6. iris-size detection;
7. skin-tone extraction;
8. parameter size/location calculations; and
9. iterative 3D-model optimization (e.g. for Lambertian model):

Ear Reconstruction

In order to create an exact replica of the head, certain features need dedicated algorithms to convert a 2D image into a 3D model. An algorithm analyses a 2D image of at least one ear and constructs a 3D model of both the left and right ears. Optimization algorithms for rendering 3D models of ears utilize alternate and/or additional parameters to the aforementioned parameters. For example, such algorithms utilize parameters (and processed parameters) including:
1. ear-location detection;
2. ear segmentation from the surroundings;
3. ear-recess (e.g. helix, antihelix, concha, and scapha) detection;
4. skin-region detection;
6. surface-curvature estimation;
7. refinement of ear contour; and
8. ear extraction.

Hair Reconstruction

Optimization algorithms for rendering 3D models of hair utilize alternate and/or additional parameters. For example, such algorithms utilize parameters (and processed parameters) including:
1. hair-line detection;
2. hair-orientation detection;
3. hair-direction detection;
4. hair-color detection;
5. hair-texture detection; and
6. hair-border refinement.

3D Shape Construction

The following algorithm utilizes two different approaches for more robust results. The first approach uses the 3D shapes database and the second approach extracts the shape from face shadows.

The first approach is based on "*A Morphable Model For The Synthesis of 3D Face*", by Volker Blanz and Thomas Vetter, Max-Planck-Institut für biologische Kybernetik, Tubingen, Germany. The desired 3D shape is constructed from aspects of 3D shapes in the existing database. The resultant 3D shape is a 'blend' of the existing 3D shapes stored in the database, aggregated from the 3D database shapes based on a set of weight coefficients which defines the exact blending. Each existing 3D shape (corresponding to a 2D facial feature) in the database is assigned a similarity coefficient reflecting the relative similarity of the corresponding 2D facial feature to the same extracted facial feature of the inputted 2D image. A 3D shape of the facial feature is defined by 'blending' the coefficients of the existing 3D shapes. This process is performed for all of the facial features of the inputted 2D image resulting in a 3D virtual replica of the facial representation of the 2D image In the second approach the face reflectance is modeled according to diffuse reflectance law with discrete light sources and ambient lighting. A shape to recover is a solution of a partial differential equation, derived from the reflectance law. For each image pixel that belongs to the face area (see Sec. '*Face segmentation*') the algorithm computes its depth value directly from the reflectance equation, so the resulting set of depths generates a smooth 3D virtual replica of the face.

Merging 3D Face with Parameterized Anatomical Head Model

Once a virtual replica of the face has been rendered, the virtual replica is merged with the parameterized anatomical head model. To do so, the parameters of the musculature and skull formation of the anatomical model are manipulated in order to bring the model into conformity with the parameters of the rendered 3D virtual replica of the face, merging the two together, thereby providing a virtual 3D augmented replica of a head and face.

Merged Augmented Replica

Referring back to FIG. 1, a communication channel A enables the user to access a merchant portal 32. Merchant portal 32 provides the user with a platform to access AR website 22. A communication channel B enables the user to browse products (e.g. eyeglasses, dolls, jewelry, clothes, and hats) in 2D/3D product database 28. A communication channel C enables the user to browse 3D models in 3D-model database 26. Optionally, a user can only browse 3D models that are listed in the user's account. A communication channel D enables the user to upload 2D model images to 3D-model database 26. A communication channel E enables the user to upload model images from image-capture device 30 into 3D-model manager 16. Once a model image is uploaded to 3D-model database 26, 3D-modeling engine 24 generates a 3D model based on the model images. The models can be viewed and rotated using AR GUI 18. Communication channel F is discussed later.

Communication channels B-D are schematically represented in FIG. 1 as direct connections to elements of AR server 20 in order to simplify the drawing for better clarity. In implementations of preferred embodiments of the present invention, such communication channels can be handled by a common network-access point from client system 10 which is operationally connected to AR website 22 via merchant portal 32. From AR website 22, communication channels B-D are routed to the respective elements.

Eyeware

As an exemplary embodiment of the present invention, the product family that is used in generating the virtual AR is eyewear. In such an implementation, 2D/3D product database 28 includes a selection of eyeglasses sorted according to category in order to make the product search fast and efficient for the user. Each pair of glasses listed includes detailed information (e.g. exact measurements and optical parameters). Optionally, a comparison module is included in 2D/3D product database 28. Such a module enables the user to select a number of glasses, and perform a detailed comparison between the glasses. The 3D images of the glasses can be viewed and rotated.

Once a merged virtual AR of a pair of glasses on a model is rendered, the colors of the glass frames and lenses can be changed without having to generate a new virtual AR. AR GUI 18 can be used to generate a snapshot of the merged virtual AR (e.g. for storing, e-mailing, and/or printing). A virtual 3D representation of the AR with glasses can be generated and displayed via AR GUI 18. The merged virtual AR can be rotated through 360 degrees. In addition, there exists the option of displaying a view as seen through the selected glasses in order to give the consumer an approximate visual representation of various options, such as but not limited to, the tint of the selected glasses, should such a tint exist, or the difference between glasses treated with anti-reflective coating and those not treated and the like. A simulated external environment can present different lighting situations such as indoors/outdoors and daytime/nighttime. Various backgrounds can be insinuated into the simulation allowing for the viewing of the merged virtual AR via AR GUI 18 within different settings such as, for example, the home or place of work.

Pressure points of glasses are points where the glasses apply pressure on the face. Such points are calculated in real-time and displayed to the user by AR GUI 18. A range of pressure intensity can be indicated (e.g. by color), so that the user can avoid selecting unsuitable glasses that can cause discomfort when worn (e.g. due to size or type). The face of the merged virtual AR can be manipulated to simulate a changing facial expression such as smiling, as well as the reciprocal movement of the merged model, so as to assess, for example, whether a particular pair of glasses will move up and down when smiling.

Merchant portal 32 provides a list of merchant websites (with clickable "pass-through" URL links) where the pair of glasses can be purchased on-line. The user selects the desired merchant website by pressing a URL link. The user can enter AR GUI 18 only through merchant portal 32.

Once the user has selected a preferred pair of glasses, the user is transferred to a purchasing screen in merchant portal 32. Optionally and additionally, upon selection of a preferred pair of glasses, AR GUI 18 can send detailed information (e.g. eye-to-eye distance, nose bridge span, and ear position) obtained from the user's virtual AR to a product-fulfillment website 34 for processing an order via a communication channel F. Product-fulfillment website 34 can use the user-specific information to customize the fit of the glasses before shipping the glasses to the user. In such an embodiment, the user is not required to go to a physical retail store for a fitting.

It is understood that the above application could be equally applied to additional accessories such as headwear (hats, wigs etc.), facial jewelry (earrings, nose studs, extraocular implants, surface piercing, microdermal implants, trans-dermal implants etc.), cosmetics and others.

Dolls

As an additional exemplary embodiment of the present invention, the product family that is used in generating the virtual AR is memorabilia creation, and specifically, custom doll creation. In such an implementation, 2D/3D-product database 28 is populated with a selection of doll configurations predefined within the database and sorted by category to allow for fast and efficient searching. Each 3D image can be viewed and rotated using AR GUI 18.

A user has access to AR-rendering application 14 which can be installed on client system 10 or accesses remotely on AR website 22. Advantages of remotely accessing AR website 22 include the option of additional remote users having access to the project in order to view and comment. Alternatively and/or additionally said additional users are granted privileges to edit the merged virtual AR as well as, where supported by hardware and software, simultaneously editing said merged virtual AR (the system supports multiple user pointing devices similar to multi-touch applications).

An individual virtual AR can be merged with an individual doll configuration, selected from the predefined configurations stored in 2D/3D product database 28, using AR-rendering application 14 either locally or remotely. Once a merged virtual AR of an image and doll is rendered by AR-rendering application 14, a virtual 3D representation can be generated and displayed via AR GUI 18. AR GUI 18 allows the user to add and/or modify various features and accessories. In a non-limiting example, hair color can be altered, accessories such as jewelry and clothing can be added as well as the modification of facial features to depict facial expressions. In addition, 2D writing can be added to the merged AR as well as 3D writing. Alternately and/or additionally, predefined configurations can be altered by the user and new configurations can be added. Additionally, the virtual AR can be 'cartoonized' rendering the 2D image into a cartoon-like virtual AR, while retaining a resemblance to the original image. This process does not entail merely applying graphical filters to a given 2D image, rather a specialized algorithm is applied to the 2D image, mapping the unique features in order to create a cartoon-like rendition of the image. A predefined set of cartoon styles are available for a user to choose from. A non-limiting, exemplary list of styles includes: square face, round face, manga style, famous cartoons (e.g. The Simpsons™) etc. In addition, facial features and expressions can be manipulated to provide exaggerated features and expressions. AR GUI 18 includes feature-parameter controls for the autonomous adjustment of body and facial features of the AR, such as but not limited to: increasing body mass, decreasing body mass, giving the appearance of happiness, sadness, additional attractiveness, kindness etc. The aforementioned process provides a virtual merged AR which is more congruent with the memorabilia in question, namely a doll or figurine.

Once the user has generated the virtual merged AR of the doll, AR GUI 18 can be used to send a digital 3D representation of the merged virtual AR to a product-fulfillment website 34 for processing an order via a communication channel F. Product-fulfillment website 34 can fabricate the merged AR using a 3D printer and coloring facilities. The 3D model is then packaged and sent to the purchaser in accordance with the information supplied on the purchase screen in merchant portal 32. The product can optionally be created on a user-defined platform, such as, by not limited to: key chains, magnets, pendants, utility accessories (toothbrush holders, pen stands, etc.) and other memorabilia. Further examples of such platforms are detailed below.

In a further embodiment, multiple virtual ARs can be merged with multiple objects taken from 2D/3D product database 28. For example, a set of virtual model figurines can be merged with the images taken from a class portrait so as to create a virtual model of said class portrait, where the figurines are connected together in the same configuration as depicted in the portrait. In a preferred embodiment, said virtual merged ARs can be mounted on a user defined platform such as a stand taken from 2D/3D product database 28. In a non-limiting example, a stand can be a model stadium upon which a model of a soccer team is merged. An additional example is a wedding cake stand upon which figurines of the bride and groom (with realistic facial features of the wedding couple) are virtually mounted. Multiple remote users can collaborate, potentially simultaneously, in the creation and modification of said model, each user remotely connecting to AR-rendering application 14, accessing and editing said model using AR GUI 18.

Once the user has generated the virtual merged AR of the figurines with or without a customized stand, the user is transferred to a purchasing screen in merchant portal 32. Optionally and additionally, AR GUI 18 can send a digital 3D representation of the merged virtual AR to a product-fulfillment website 34 for processing an order via a communication channel F. Product-fulfillment website 34 can fabricate the merged AR using a 3D printer and coloring facilities. The 3D model is then packaged and sent to the purchaser in accordance with the information supplied on the purchase screen in merchant portal 32.

Makeup Application/Accessory Fitting

As discussed above, the innovative system allows for a unique virtual experience of applying makeup or fitting an accessory. An exemplary application is envisioned whereby a stand-alone system for a cosmetics store exists. The system includes a computer system (monitor, CPU, internal memory, power source etc) having a downloaded client application for 3D AR creation installed on the system, an imaging device such as a webcam and optionally a bar code reader. A user, interested in virtually applying makeup to assess whether a particular product is worthwhile purchasing, uses the imaging device to record a digital 2D image of their face. The system automatically converts the 2D image into a 3D model AR. The user uses the GUI to select a product, optionally by using a barcode reader to read the barcode of the desired product, or from a catalogue, and thereafter virtually applies the makeup to the 3D AR. The AR itself can be manipulated using and intuitive and user friendly system of sliders to control facial expressions and functions. For example, an eyelid slider can be manipulated to close one eye halfway or completely so as to assess how a particular brand of eye-shadow, applied to the eyelid, looks. The realistic manipulation of the facial features is possible due to the bone structure and muscle systems which are inherent in the 3D AR. A preferred exemplary implementation is an online version of the abovementioned application, where the user enjoys the virtual experience from the comfort of the home. In such an implementation, product database 28 includes a catalogue of makeup and/or other accessories such as a hat or earrings. Each unit item in the catalogue has a unique product identification (ID) number. Once selected from product database 28, the user can virtually apply the product to the virtual 3D AR, thereby merging the virtual AR with a product model. The merged virtual 3D AR can be further manipulated via AR GUI 18 to change facial expression, rotate the 3D model, substitute applied product etc. AR GUI 18 can be used to generate a snapshot of the merged virtual. AR (e.g. for storing, e-mailing, and/or printing).

Merchant portal 32 provides a list of merchant websites (with clickable "pass-through" URL links) where the selected product can be purchased on-line. The user selects the desired merchant website by pressing a URL link. The user can enter AR GUI 18 only through merchant portal 32. Once the user has selected a preferred product, the user is transferred to a purchasing screen in merchant portal 32. Purchase details are sent to product-fulfillment website 34, via communication channel F. A product fulfillment warehouse processes the ordered item, mailing the purchased product to the user.

Special FX/Reconstructive Surgery/Game Figure Creation

For applications where a high level of detail is desired in a virtual 3D AR, the incorporated anatomical true musculature and bone structure layers are indispensible. For the creation of special effects (FX) face masks and accessories, an online or client based application of the current invention is utilized. Communication channel D enables the user to upload 2D model images to 3D-model database 26. A communication channel E enables the user to upload model images from image-capture device 30 into 3D-model manager 16. Once a model image is uploaded to 3D-model database 26, 3D-modeling engine 24 generates a 3D model based on the model images. The models can be viewed and rotated using AR GUI 18. At this point, the rendered virtual 3D AR can be transferred for printing on a 3D printer. Optionally and additionally, the application can be accessed online for remote collaboration of distanced individuals, such as the FX specialist (located in the USA) and the actor (located in the UK). AR GUI 18 supports multiple users collaborating on a project, optionally having simultaneous input control.

Reconstructive Surgery

In the field of reconstructive surgery, the current invention provides a cost effective and time efficient system for creating 3D representations of body parts which can potentially serve many purposes in the field of reconstructive surgery. In one exemplary application, a 3D replica of a face can be used by plastic surgeons as a visual aid to explain a particular procedure to a patient. The surgeon captures a 2D image of the patient's face, and uploads the image to the system. 3D-modeling engine 24 generates a 3D model based on the 2D image. The generation of a 3D virtual AR from the 2D image is fully automated without the need for intervention from a graphic artist or a software technician. A medical practitioner who is not skilled in the art of graphical and software technology is still able to make full use of the system. The 3D virtual AR can be manipulated with GUI 18 to rotate and view the face as desire. Additionally, the surgeon can virtually 'peel' the skin away exposing the muscles and nerves to better explain the proposed procedure. If need be, the layer of musculature can also be 'peeled' away exposing the bone structure beneath. GUI 18 further provides tools for manipulating the virtual AR so as to simulate the proposed procedure for the benefit of the patient. A related yet additional application is for the surgeon himself to plan and prepare for the surgery. To this end, a high-level 3D model can be generated with a 3D printer, although the usefulness of such a model is generally limited to rigid structures such as bones.

Game Figure Creation

A time efficient and cost effective method and system is provided for the creation of 3D video game characters with realist features. Currently, expensive and complicated software systems are used by extensively trained graphic artists to create video game characters which look like real, famous, people, over many work hours. The current innovation allows for fully automated creation of a 3D virtual AR from one or more 2D images. An intuitive, user-friendly GUI 18 enables users to quickly and easily animate the realistic 3D virtual AR with facial expressions and movements. The virtual AR of the head is then connected to a virtual body and manipulated according to the desires of the video game designers.

The abovementioned processes can be applied to numerous products and body-parts. Various additional applications are envisioned. One exemplary application is the ability to purchase an article of clothing or jewelry for a second person as a surprise. The system of the invention allows for exact fitting of the desired article to the person in question without the presence or knowledge of that person. Another envisioned application is trying on makeup. A merchant website offering a cosmetic and makeup catalogue offers an application for uploading a virtual AR, and facilitating the virtual application of cosmetic materials to the virtual AR. A potential customer is able to assess each product in the catalogue and thereby make an informed decision as to which product to purchase. Additionally, AR rendering application 14 provides a subroutine for the virtual application of cosmetics and makeup. Optionally and additionally, a cosmetics catalogue can be uploaded to a remote session on AR rendering application 14 or downloaded to a local session of the application. A user can virtually apply makeup to an AR in order to assess the effectiveness of a particular style of makeup application and/or product use for said cosmetic application.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:
1. A system for rendering a virtual 3D augmented replica, the system comprising:
   a. a 2D model manager adapted to store an acquired 2D model image of a body part;
   b. a 3D modeling engine adapted to transform said 2D model image of said body part into the virtual 3D augmented replica thereof, said 3D modeling engine configured to model at least one diffuse-reflectance parameter of at least one image pixel of said 2D model image, wherein said at least one diffuse-reflectance parameter is correlated to a representative depth value of said at least one image pixel, and wherein said representative depth value is selected from at least one smooth region of said 2D model image and applied for albedo environmental-color diffuse-reflection removal to at least one distorted region of said 2D model image, in order to generate the virtual 3D augmented replica thereof.
2. The system of claim 1, the system further comprising:
   c. a 2D/3D product database of product 3D images;
   d. a graphic user interface adapted to merge a selected product 3D image from said product database with the virtual 3D augmented replica to provide a merged virtual 3D augmented replica having a merged product image, wherein said graphic user interface is operable to display and manipulate said merged virtual 3D augmented replica; and
   e. an actuating unit adapted to actuate said merged virtual 3D augmented replica on a physical medium.
3. The system of claim 2, wherein said body part is a face.
4. The system of claim 3, wherein the virtual 3D augmented replica includes a layer of musculature.
5. The system of claim 4, wherein the virtual 3D augmented replica further includes a skeletal structure.
6. The system of claim 5, wherein said musculature is operatively manipulated, using said graphical user interface, so as to simulate muscular activity.
7. The system of claim 6, wherein said simulated muscular activity is selected from the group consisting of:
   a. a smile;
   b. a frown;
   c. raising of eyebrows;
   d. closing and opening of an eye;
   e. opening and closing of a mouth;
   f. partial opening and closing of an eye;
   g. partial opening and closing of a mouth;
   h. a wink;
   i. a facial twitch; and
   j. a complex facial expression.
8. The system of claim 7, wherein said simulated muscular activity has a reciprocal effect on said merged product image, said reciprocal effect selected from the group consisting of:
   i. movement of said merged product image; and
   ii. pressure of said product 3D image on the virtual 3D augmented replica.
9. The system of claim 8, wherein said graphical user interface is configured to enhance said merged virtual 3D augmented replica into an enhanced virtual 3D augmented replica having enhancements selected from the group consisting of:
   a. product image color manipulation;
   b. added environments; and
   c. product image parameter manipulation.
10. The system of claim 9, wherein said 3D modeling engine is adapted to utilize discrete light-source information and/or ambient-light information from said at least one diffuse-reflectance parameter to generate said added environments which are selected from the group consisting of:
   i. background indoor environments;
   ii. background outdoor environments;
   iii. background day environments; and
   iv. background night environments.
11. The system of claim 5, wherein said graphical user interface is configured to enhance the virtual 3D augmented replica into an enhanced virtual 3D augmented replica having enhancements selected from the group consisting of:
   i. accessory addition;
   ii. facial feature modification;
   iii. added platforms;
   iv. feature cartoonization;
   v. expression simulation; and
   vi. body addition.
12. The system of claim 11, wherein said added platforms are selected from the group consisting of:
   i. user-defined stands;
   ii. key chains;
   iii. memorabilia;
   iv. utility accessories;
   v. cake-top figurine stands; and
   vi. magnets.
13. The system of claim 12, wherein said enhanced virtual 3D augmented replica is selected from the group consisting of:

i. a figurine;
ii. a computer implemented video game character;
iii. a face mask; and
iv. a virtual surgery simulation object.

14. The system of claim 2, wherein said actuating medium is selected from the group consisting of:
i. a 3D printer; and
ii. a 2D printer.

15. The system of claim 14, wherein said product image is selected from the group consisting of:
i. eyeglasses;
ii. headwear;
iii. cosmetics; and
iv. facial jewelry.

16. The system of claim 1, wherein said representative depth value is further applied for albedo cast-shadow removal to said at least one distorted region.

17. The system of claim 16, wherein said cast shadow removal is applied to at least one edge cast in said at least one distorted region.

18. A method for rendering a virtual 3D augmented replica, the method comprising the steps of:
  a. receiving a 2D image of a body part;
  b. providing a parameterized anatomical model of said body part;
  c. constructing a virtual 3D replica that corresponds to said 2D image of the body part by modeling at least one diffuse-reflectance parameter of at least one image pixel of said 2D image, wherein said at least one diffuse-reflectance parameter is correlated to a representative depth value of said at least one image pixel, and wherein said representative depth value is selected from at least one smooth region of said 2D model image and applied for albedo environmental-color diffuse-reflection removal to at least one distorted region of said 2D model image, in order to generate said virtual 3D replica;
  d. adjusting values of parameters of said parameterized anatomical model to conform said parameterized anatomical model to said virtual 3D replica, thereby providing the virtual 3D augmented replica of said body part; and
  e. outputting the 3D virtual augmented replica to a medium.

19. The method of claim 18, wherein said medium is selected from the group consisting of:
i. a storage medium;
ii. a display medium; and
iii. a transmission medium.

20. The method of claim 19, wherein said display medium is a graphical user interface.

21. The method of claim 18, wherein said parameterized anatomical model includes a layer of musculature.

22. The method of claim 21, wherein said parameterized anatomical model further includes a skeletal bone structure.

23. The method of claim 22, wherein said body part is a face.

24. The method of claim 23, wherein said step of constructing includes:
i. extracting features from said 2D image;
ii. providing a plurality of virtual 3D replicas;
iii. providing, for each virtual 3D replica, a corresponding plurality of 2D features;
iv. assigning a respective measure of similarity of each said extracted feature to each of a plurality of similar stored 2D features of corresponding stored virtual 3D replicas; and
v. constructing said virtual 3D replica by blending said stored virtual 3D replicas based on said respective measures of similarity.

25. The method of claim 22, wherein said virtual 3D replica is selected from the group consisting of:
i. a depth map;
ii. a set of polygons;
iii. an array of dots;
iv. a non-uniform rational basis spline;
v. splines and patches; and
vi. subdivision surfaces.

26. The method of claim 18, wherein said representative depth value is further applied for albedo cast-shadow removal to said at least one distorted region.

27. The method of claim 26, wherein said cast shadow removal is applied to at least one edge cast in said at least one distorted region.

28. A system for rendering a virtual 3D augmented replica, the system comprising:
  a. a 2D model manager adapted to store an acquired 2D model image of a body part;
  b. a parameterized anatomical model of said body part;
  c. a virtual 3D replica generator adapted to construct a virtual 3D replica that corresponds to said acquired 2D model image, said virtual 3D replica generator configured to model at least one diffuse-reflectance parameter of at least one image pixel of said 2D image, wherein said at least one diffuse-reflectance parameter is correlated to a representative depth value of said at least one image pixel, and wherein said representative depth value is selected from at least one smooth region of said 2D model image and applied for albedo environmental-color diffuse-reflection removal to at least one distorted region of said 2D model image, in order to generate said virtual 3D replica;
  d. a 3D modeling engine configured to adjust the values of the parameters of said parameterized anatomical model to conform said parameterized anatomical model to said virtual 3D replica, thereby providing the virtual 3D augmented replica of said body part; and
  e. a medium adapted to output the virtual 3D augmented replica.

29. The system of claim 28, wherein said medium is selected from the group consisting of:
i. a storage medium;
ii. a display medium; and
iii. a transmission medium.

30. The system of claim 29, wherein said display medium is a graphical user interface.

31. The system of claim 28, wherein said parameterized anatomical model includes a layer of musculature.

32. The system of claim 31, wherein said parameterized anatomical model further includes a skeletal bone structure.

33. The system of claim 32, wherein said body part is a face.

34. The system of claim 33, wherein said virtual 3D replica generator is configured to:
i. extract features from said 2D image;
ii. provide a plurality of virtual 3D replicas;
iii. provide for each virtual 3D replica, a corresponding plurality of 2D features;
iv. assign a respective measure of similarity of each said extracted feature to each of a plurality of similar stored 2D features of corresponding stored virtual 3D replicas; and v. construct said virtual 3D replica by blending said stored virtual 3D replicas based on said respective measures of similarity.

35. The system of claim 31, wherein said virtual 3D replica is selected from the group consisting of:
  i. a depth map;
  ii. a set of polygons;
  iii. an array of dots;
  iv. a non-uniform rational basis spline;
  v. splines and patches; and
  vi. subdivision surfaces.

36. The system of claim 28, wherein said representative depth value is further applied for albedo cast-shadow removal to said at least one distorted region.

37. The system of claim 36, wherein said cast shadow removal is applied to at least one edge cast in said at least one distorted region.

38. A system for rendering a merged virtual 3D augmented replica, the system comprising:
  a. a 2D/3D product database of product 2D images and product 3D images;
  b. a 2D model manager adapted to store an acquired 2D model image of a body part;
  c. a 3D modeling engine adapted to transform said 2D model image of said body part into a virtual 3D augmented replica thereof; and
  d. a graphic user interface adapted to merge a selected product 3D image from said product database with said virtual 3D augmented replica to provide the merged virtual 3D augmented replica, said graphic user interface is operable to display and manipulate the merged virtual 3D augmented replica, said graphic user interface adapted to utilize at least one product lighting attribute, said at least one product lighting attribute selected from the group consisting of: respective discrete light-source information, reflectance information, and ambient-light information, in said selected product 3D image, in order to augment at least one replica lighting attribute of said virtual 3D augmented replica in the merged virtual 3D augmented replica, and wherein:
  i. upon a given measurement of said selected product 3D image in the merged virtual 3D augmented replica not corresponding to a reciprocal measurement of said virtual 3D augmented replica, applying at least one reciprocal pressure point on said virtual 3D augmented replica in the merged virtual 3D augmented replica, wherein said at least one reciprocal pressure point is based on real-world physics.

39. A method for rendering a merged virtual 3D augmented replica, the method comprising the steps of:
  a. providing a 2D/3D product database of product 2D images and product 3D images;
  b. storing an acquired 2D model image of a body part;
  c. transforming said 2D model image of said body part into a virtual 3D augmented replica thereof; and
  d. merging a selected product 3D image from said product database with said virtual 3D augmented replica to provide the merged virtual 3D augmented replica, said step of merging utilizing at least one product lighting attribute, said at least one product lighting attribute selected from the group consisting of: respective discrete light-source information, reflectance information, and ambient-light information, in said selected product 3D image, in order to augment at least one replica lighting attribute of said virtual 3D augmented replica in the merged virtual 3D augmented replica, and wherein:
  i. upon a given measurement of said selected product 3D image in the merged virtual 3D augmented replica not corresponding to a reciprocal measurement of said virtual 3D augmented replica, applying at least one reciprocal pressure point on said virtual 3D augmented replica in the merged virtual 3D augmented replica, wherein said at least one reciprocal pressure point is based on real-world physics.

\* \* \* \* \*